Oct. 4, 1932.   A. M. BUSWELL ET AL   1,880,772
APPARATUS FOR PRODUCING METHANE
Filed Sept. 11, 1930   2 Sheets-Sheet 1
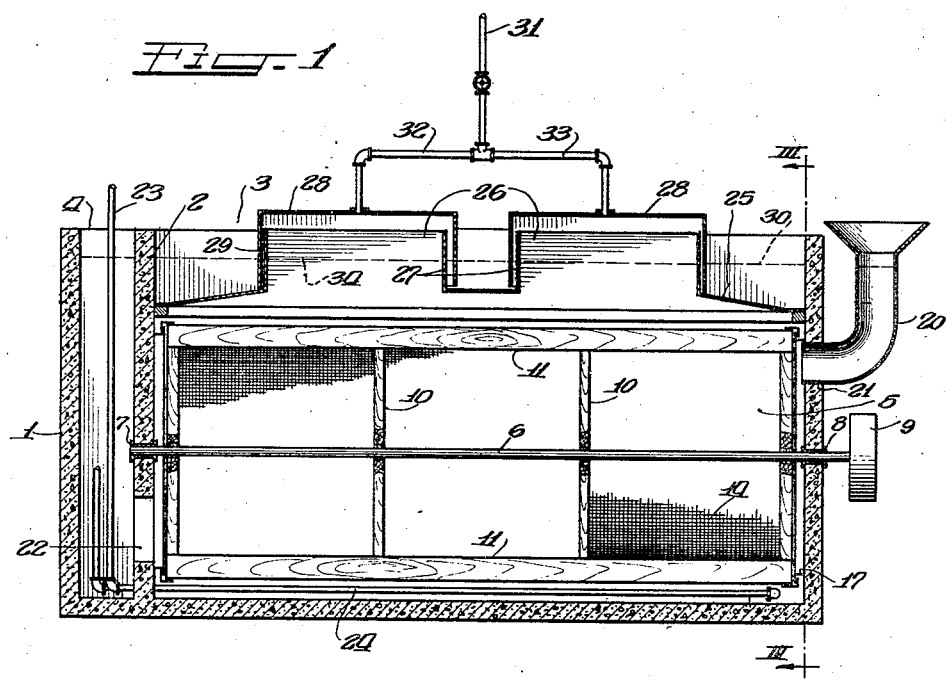
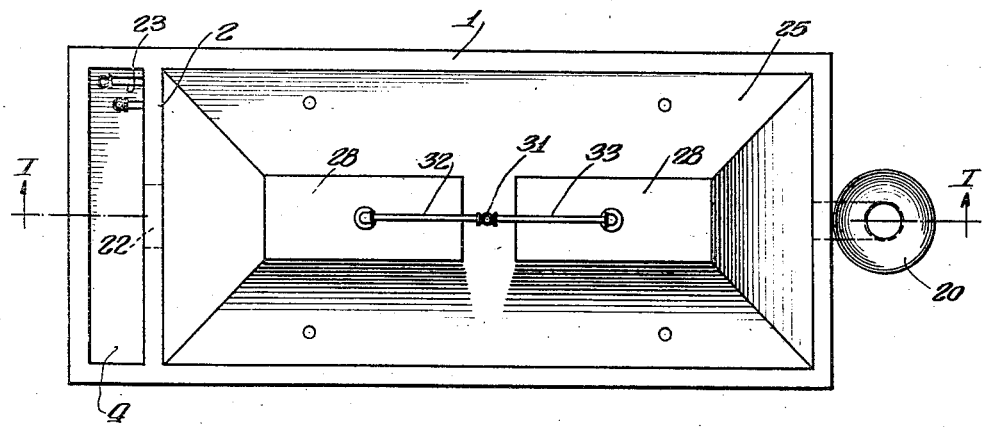
Inventors:
Arthur M. Buswell.
Clair S. Boruff.
by Charles G. Hill Attys Oct. 4, 1932.  A. M. BUSWELL ET AL  1,880,772
APPARATUS FOR PRODUCING METHANE
Filed Sept. 11, 1930   2 Sheets-Sheet 2
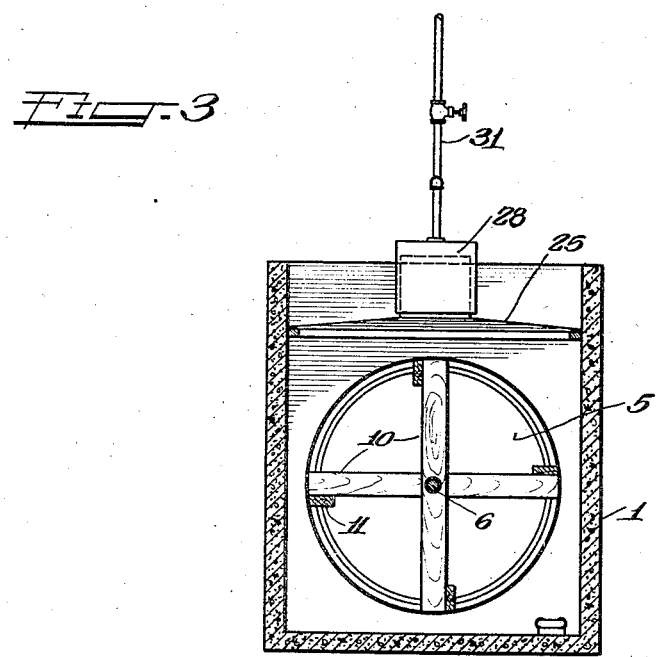
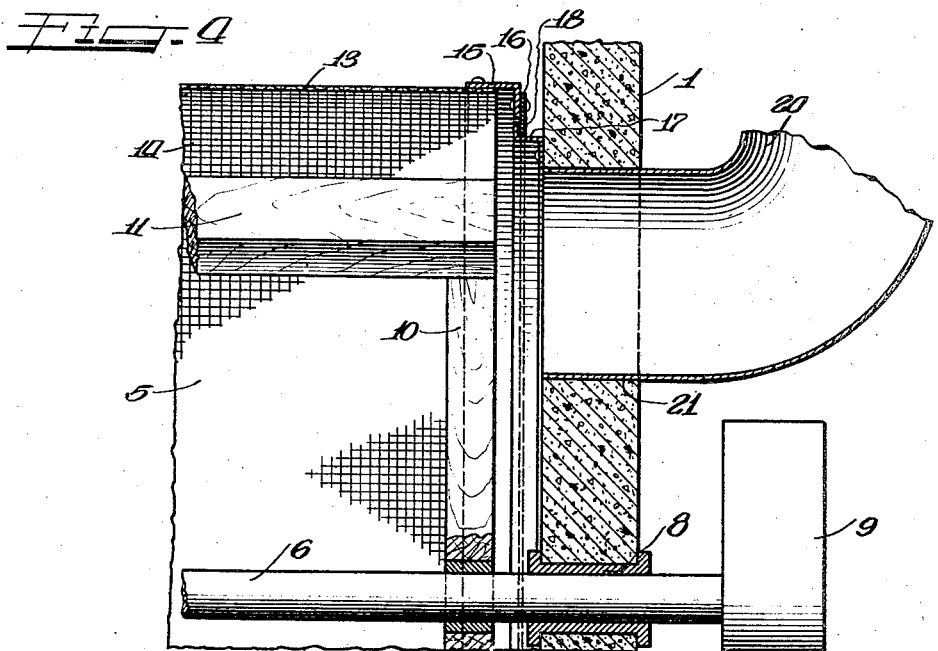
Inventors:
Arthur M. Buswell.
Clair S. Boruff.
by Charles W. Hills Attys.

Patented Oct. 4, 1932

1,880,772

UNITED STATES PATENT OFFICE

ARTHUR M. BUSWELL, OF URBANA, AND CLAIR S. BORUFF, OF MONMOUTH, ILLINOIS

APPARATUS FOR PRODUCING METHANE

Application filed September 11, 1930. Serial No. 481,142.

This invention relates to a method of producing methane and more particularly to a controlled bacterial decomposition process for preparing directly combustible gaseous mixtures rich in methane.

It has heretofore been known that various types of bacterial decomposition result in the formation of gaseous products. Sewage sludge, for instance when subjected to bacterial decomposition under proper conditions breaks down to form a combustible gas composed principally of methane, carbon dioxide and hydrogen, the methane being the important combustible constituent. The amount of gas that may be produced from this source, however, is at best not greater then 1 cu. ft. per capita per day, or less than 5% of the usual per capita daily consumption of fuel gas.

Various investigations of the sludge composition before and after digestion (O'Shaughnessy, J. Soc. Chem. Ind. 33, 3R (1914); S. L. Neave with A. M. Buswell, Fate of grease in sludge digestion, Ind. and Eng. Chem. 19, 9, page 1012 (1927); A. M. Buswell, G. E. Symons and E. L. Pearson, Observations on two-stage sludge digestion 1928-29, Sewage Works Journal II, 2 (1930)) indicate that the gas results principally from the decomposition of greases (fats and soaps) and proteins, and possibly cellulose that was originally introduced into the sewage in the form of thin paper manufactured from chemical pulp. Observation of sludge which has been subjected to digestion for three to six months shows the presence of matches, newspaper made from mechanical pulp, and other forms of woody material in an unaltered state. Such observations have led to the conclusion that those forms of crude plant tissue sometimes referred to as ligno-cellulose are resistant to that type of bacterial digestion or fermentation which results in methane formation.

Dibdin (W. J. Dibdin, The Purification of Sewage and Water, Sanitary Pub. Co. Ltd., London, 3rd ed., 1903, page 5) in discussing bacterial action on various substances states: "Woody fibre, such as paper pulp and débris from street paving, is especially refractory . . .", and Fowler (G. J. Fowler, J. Ind. Inst. of Sci. 3, 39 (1920), discussing this reaction, states that ". . . cellulose is not attacked when it is in combination with pectin, lignin, etc., which are always present in raw vegetable tissues".

Furthermore, the decomposition of plants which occurs in swamps is a very slow process giving off a small amount of methane and eventually resulting in the conversion of a large part of the material into peat. The fermentation of straw and the like in manure piles also results in the formation of humus with the evolution of small amounts of gas composed mostly of hydrogen and carbon dioxide with some methane, the latter probably from fecal matter in the manure.

It is also well known that "pure" cellulose in the form of filter paper, chemical pulp or "half stuff" may be fermented with the production of considerable yields of various acids, alcohols and ketones together with the formation of small amounts of gas composed mainly of carbon dioxide and hydrogen with irregular and small amounts of methane.

In all of these various processes a certain amount of air or oxygen is present or artificially introduced.

The simpler carbohydrates such as glucose, xylose and starch have a strong tendency to form acids rather than methane, even in the absence of air or oxygen. For example Mizuno (French Patent No. 571,967) described the fermentation of rice and wheat brans, which contain over 50 per cent starch. After three weeks fermentation, Mizuno states that he obtains a gas containing 30 per cent methane. An experiment of our own shows more definitely the tendency of starch to form acids rather than methane:

| Experiment | | |
|---|---|---|
| 10 grams starch | Volume of gas | Composition by volume |
| 1 to 6th day | 1732. cc. | Per cent<br>CO$_2$ 49.0<br>H$_2$ 37.2<br>CH$_4$ 10.0<br>N$_2$ 3.8 |
| 6 to 35th day | 200 cc.<br>pH 5.4 | |
| 35 to 55th day | 200 cc.<br>pH 4.8 | |

Volatile acids 6.3 grs. as acetic acid.

The possible sources, then, from which fuel gas may be produced by bacterial decomposition may be stated to be:

(1) Sewage sludge, which gives a good fuel gas but is available in such amounts only as to be of small economic importance;

(2) Waste fats and proteins, which ferment well to form methane but are too valuable to serve such process commercially, and (3) Waste cellulosic materials, which are available in vast quantities and practically worthless, but the use of which has heretofore been regarded as an unsolved problem.

Bradley and Rettger (Leon A. Bradley and Leo F. Rettger, Studies on aerobic bacteria commonly concerned in the decomposition of cellulose, Journal of Bacteriology, XIII, 5, page 321 (1927) state: "In nature the decomposition of cellulose goes on uncontrolled, and the products formed are immediately acted upon by microorganisms as sources of energy and food. In this way countless tons of decaying vegetable matter go to waste yearly. It might well be said that cellulose is almost an economic loss. If the biological process of decomposition could be carried on by pure culture methods and under scientific control, it should be possible to redeem the economically important cleavage products and convert them to every day use for man. Such mastery of nature is as yet only a dream, but from an analytical viewpoint it seems entirely possible." Thaysen and Bunker (The microbiology of cellulose, hemicelluloses, pectin and gums, by Thaysen and Bunker, Oxford University Press, page 313, 1927) say: "The production of combustible gases. Though the marsh gas which escapes from the ground in some localities has been used as a combustible gas for domestic purposes for many years, and though numerous investigations have shown that the microbiological decay of vegetable débris frequently gives rise to the evolution of such gases, especially methane and hydrogen, few attempts have so far been made to utilize these reactions for the commercial production of gaseous fuels. Those made have not yet succeeded in establishing this industry, even in localities where vegetable débris is abundant and coal deficient. This, no doubt, is largely due to the existing imperfect knowledge of the microbiology of hemicelluloses and cellulose, and to the consequent difficulties encountered in attempting to control the breakdown of these substances on a technical scale. There is no prima facie reason to believe that such processes should necessarily be uneconomical. On the contrary, they appear to constitute a fruitful field for future investigations."

We have, however, now found that under proper conditions cellulosic material may be converted by bacterial decomposition quantitatively into a combustible gas mixture containing about 54 per cent methane and that the yield from such material as cornstalks amounts to from 10 to 20 thousand cubic feet of gas per ton of raw material treated. The rate of gas production, according to our process, exceeds a half a cubic foot per cubic foot of fermentation tank volume.

It is therefore an object of our invention to provide a process for producing methane from cellulosic material by bacterial decomposition.

It is a further important object of our invention to provide a process for producing directly combustible mixtures of gases rich in methane by a controlled and regulated bacterial action upon waste, raw vegetable material.

It is a further important object of this invention to provide improved apparatus for carrying out such process.

Other and further important objects of this invention will become apparent from the following description and appended claims.

The starting material for our process may be any raw vegetable material having a cellulosic content sufficiently high to render the process economically practicable. By "cellulosic content" we mean raw vegetable or fibrous tissue, exclusive of fats, proteins, waxes, starches, sugars and ash; that is, that portion of the plant substance which remains after extraction with hot water and after subtraction of fats, waxes, proteins and ash, as determined by well known methods.

Our invention is not directed to the application of our process to pure cellulose, although that can be used, but to the use of waste or raw vegetable materials in which the cellulose fibres are found in substantially their natural state, encrusted or interpersed with lignin and other cellulosic material, and in which the cellulosic content is the major constituent. In other words, our starting material is that type of plant substance that has heretofore been regarded as particularly resistant to methane fermentation and that has never heretofore to the best of our knowledge, been successfully subjected to a bacterial decomposition action for the production of methane.

The following is a table showing the cellulosic content of representative vegetable materials suitable for use as starting material in our process:

| Material | Hot water insoluble (on dry, ash, protein and fat free basis) |
|---|---|
| | Per cent by weight |
| Cornstalks | 75 to 90 |
| Corn cobs | 80 to 90 |
| Straws | 80 to 90 |
| Wood, excelsior, etc. | 90 to 98 |
| Peanut hulls | 85 to 95 |
| Oat hulls | 80 to 90 |

We have found that our process is applicable to both endogenous and exogenous types of plants and to various portions of the plant such as stem, leaf, fruit hull, and the like. Among the materials tested and found to give good yields of methane are the following:

Cornstalks
Corn cobs
Bagasse, fiber
Threshing machine chaff
Citrus pulp waste
Wheat straw
Broom cornstalks
Banana stems
Newspaper pulp
Excelsior
Wood flour
Swamp weeds, mixed
Swamp weeds, pith bearing (probably Scirpus or Juncus)
Cat tail stalks
Peanut hulls
Alfalfa hay
Leaves (mixed)
Maize wood sawdust
Oat hulls
Flax straw
Flax shives It is an important requirement of our process that the material used be rather finely subdivided in order to provide for prompt and effective inoculation of an extensive surface area in contact with the bacterial culture. For this purpose we have found the chopping and shredding accomplished by certain standard types of ensilage cutters sufficient for endogenous plants of loose texture. Exogenous plant tissue may be fermented if reduced to the condition of excelsior used for packing or to "wood flour", or mechanical pulp.

The substantial exclusion of oxygen is essential to the success of our process. The introduction of air into the fermentation tank when adding the material to be treated is best avoided by a preliminary or prior soaking of the material in water or in some of the liquor from the tank. This soaking displaces the air which would otherwise be held among the particles and on the surface of the finely divided material. We have found, for example, that 50 per cent of the air in shredded cornstalks is displaced by 30 minutes soaking in cold water. Hot water may be used, or a solution of acid or alkali, or other chemical agent may be employed for the soak process to produce additional softening of the tissue but we have not found this necessary to the success of the process. In fact, we have found that with careful manipulation dry material may be introduced without the introduction of harmful amounts of air.

The exclusion of air or oxygen is further accomplished by the use of a fermentation tank (to be described below) so designed that the fermenting mixture is completely sealed from the air.

The regulation of the ammonia content of the liquor is also an important part of our process. When the ammonia is too low, the rate of gasification decreases and the amount of volatile fatty acids increases. This is illustrated in the following table:

Effect of $NH_4$—N concentration on rate of gasification of cornstalks (All other variables kept as near constant as possible)

| Volume of digestion tank | 140 cu. ft. |
|---|---|
| Cornstalks fed, pounds per day (dry) | 6 to 10 |

During an 18-day period (low $NH_4$—N content)

| | Maximum | Minimum | Average |
|---|---|---|---|
| $NH_4$-N (ppm.) | 28.0 | 4.2 | 15.1 |
| Volatile acids as acetic (ppm.) | 494 | 275 | 377 |
| Gas per day (cubic feet) | 8.9 | 3.5 | 6.8 |

During a 51-day period ($NH_4$—N content regulated)

| | Maximum | Minimum | Average |
|---|---|---|---|
| $NH_4$—N (ppm.) | 123.9 | 23.8 | 59.6 |
| Volatile acids as acetic (ppm.) | 364 | 95 | 223 |
| Gas per day (cubic feet) | 68 | 24 | 34.2 |

It is advantageous though not necessary to start the process by inoculation with material which is actively undergoing methane fermentation. When organic matter starts to decompose spontaneously under anaerobic conditions a variety of chemical reactions take place but as the process continues the methane producing bacteria gain the ascendency and thereafter the decomposition proceeds with the formation of methane as the characteristic product. When cellulosic material is inoculated with such an active culture the production of methane begins promptly. Convenient sources of active methane fermenting bacteria are sludge from active sewage sludge digestion tanks, liquor from such tanks, and from other locations where organic matter is undergoing active methane fermentation. Good inocula can also be obtained by the inoculation of small amounts of the material and transferring it successively to larger amounts as the fermentation gets under way.

In early experiments it was observed that the fermenting material formed a thick mat at the top of the vessel or tank and that unless this mat is broken up the fermentation is greatly retarded. We found, however, that if the fermentation vessel is arranged with flexible connections or otherwise so that it may be inverted from time to time, the mat was broken up and the fermentation proceeded smoothly and at a rapid rate. The data on the rate of gas evolution from a stationary fermentation flask and one which could be inverted illustrates this point.

*Rate of fermentation of cornstalks*

(Cubic centimeter of gas per 10 gms. of dry stalks in 10 days)

|  | Cubic centimeters |
|---|---|
| In tip-top apparatus | 2400 |
| In stationary apparatus | 1500 |

The inversion of the fermentation vessel has other advantages. After the inversion the more resistant material remains for a time at the bottom of the vessel and may be separated from the more active material and removed from the vessel, thus leaving room for the introduction of increasing quantities of fresh material.

The inversion also serves to thoroughly mix fresh material with fermenting material thereby insuring thorough inoculation of the fresh material. It also prevents the accumulation of intermediate products of fermentation in high concentration in any one portion or zone of the culture.

A suitable type of apparatus for carrying out our process is illustrated in the accompanying drawings, in which, Figure 1 is a longitudinal sectional view taken substantially on line I—I of Figure 2;

Figure 2 is a top plan view of the fermentation tank;

Figure 3 is a sectional view taken substantially on line III—III of Figure 1; and Figure 4 is an enlarged fragmentary sectional view at the intake end of the bank.

The reference numeral 1 indicates, as a whole, a fermentation tank for carrying out the process of our invention. Said tank 1 is suitably made of concrete to minimize heat losses, but may be made of any other structural material having the desired characteristics. The tank 1 is preferably of rectangular shape and provided with a transversely extending vertical baffle 2 spaced from one end thereof to divide the tank into two compartments, a relatively large digestion compartment 3 and a smaller discharge compartment 4.

A cylindrical drum 5 is mounted horizontally within the digestion compartment 3 upon a shaft 6 journalled in bearings 7 and 8 carried by the wall 2 and end wall of the tank. Said drum 5 is adapted to be rotated continuously or intermittently at any suitable speed, as by means of a pulley 9 carried by the outer extended end of the shaft 6. The frame of the drum 5 comprises a plurality of radially extending supporting arms 10 to which are attached longitudinally extending bars 11. The frame is covered with a cylinder 13 of reticular material, such as wire screening 14, or perforated metal or the like. Each end of the cylindrical drum 5 is provided with a circular angle iron 15, which is secured to the bars 11 and which serves to maintain the cylindrical form of the wire covering 14. Said circular angle irons 15 extend outwardly from the respective ends of the drum 5 with their inwardly directed flanges 16 spaced from said drum ends. Circular Z-bars 17 are secured to the adjacent end wall of the tank and baffle wall 2, respectively, to extend within and slightly spaced from the circular angle bars 15. Rings 18 are secured to the circular angle irons 15 to form extensions of the inwardly directed flanges 16 so as to extend within the channel provided between the Z-bars 17 and the adjacent tank wall surfaces. The clearance between the rings 18 and the Z-bars 17 is adjusted so as to prevent the escape of material from within the drum into the outer portions of the compartment 3.

The feeding end of the tank is provided with a spout 20 extending through an opening in the tank end wall, as at 21, within the circle formed by the Z-bars 17. The material to be treated may thus be fed directly into the open end of the drum 5 adjacent said feeding spout 20. A discharge opening 22 is provided in the lower portion of the baffle wall 2 to permit undecomposed material from the drum 5 to pass out into compartment 4. It should be noted that the sealing means provided by the angle irons 15, rings 18 and Z-bars 17 at both ends of the drum 5 prevents material, either during charging or discharging, from working its way out of the drum 5 into the surrounding space in the compartment 3. Material discharged into the compartment 4 is withdrawn in any suitable and convenient manner.

In order to provide for the heating of the fermentation tank, when necessary, a pipe 23 extends to the bottom of the compartment 4 and is there connected to a loop, or coil of piping 24, through which hot water or steam may be circulated, as desired. We propose under some circumstances to surround the fermentation tank with manure to utilize the head generated by the action of thermophillic bacteria, or to use the residue from our fermentation process, which we have noted becomes heated when piled in a moist condition.

A main cover 25 is fitted to the walls of the compartment 3 to form a tight joint therewith above the drum 5.

Said cover 25 is provided with one or more gas vents 26 having upstanding side walls 27. Each of the gas vents 26 is provided with a separate gas collecting hood 28 having depending side walls 29 extending down around the upstanding side walls 27 of the gas vents and slightly spaced therefrom. A seal is provided between said hoods 28 and gas vents 26 by filling the compartment 3 above the main cover 25 with water to a level as indicated by the dotted lines 30. The water seal thus provided prevents the entrance of air into the digestion compartment where the fermentation takes place and also the escape of gas. The water seal likewise prevents the building up of excessive pressures within the digestion chamber and tends to keep a uniform, slight pressure therein. A pipe 31, connected by means of branch pipes 32 and 33 to the collecting hood 28, serves to draw the gas out into a suitable reservoir or any device in which the gas may be used or stored.

Operation

In operating our apparatus, the tank 1 is first filled with water to substantially the level of the dotted line 34 to displace practically all air therefrom. Water for the water seal is also added above the cover 25 to about the height indicated by the dotted lines 30. In place of water for filling the interior of the tank 1, sewage may be used, or ammonia may be added in suitable quantities to the water. Sufficient seeding material is then added to induce active methane evolution. Fermenting sludge or enriched cultures, such as described above, may be employed as seeding material.

The raw vegetable material in suitably comminuted form is introduced into the drum 5 through the spout 20. This raw vegetable material may be any of the materials mentioned in the above list or any other waste material having a cellulosic content of greater than say 50% calculated on a dry basis. The material to be fermented is preferably first soaked in water to expel as much air as possible from its pores and interstices and for this purpose may be subjected to some mild chemical treatment adapted to soften and loosen the fibrous material. Satisfactory results can be obtained, however, without resorting to any preliminary soaking or chemical treatment.

The introduction of the raw material may be either intermittent or continuous and its rate of introduction will depend upon the rate of gas formation desired. As the fermentation proceeds, the fermenting material collects in the upper portion of the drum 5, revolution of which dislodges the material and releases gas bubbles from the mass. The drum 5 may be either revolved continuously at a slow rate or at any desired intervals. Whether the drum 5 is revolved continuously or merely rotated through a small arc intermittently is not important, but it is important that the drum be moved in some manner to present a free upper surface for the liberation of gases from the drum. The tendency is for the fermenting fibrous material to mat tightly against the screen on the top side of the drum, due to the formation of gas bubbles over the surface of the material, and it would be very difficult and laborious to manually remove or mechanically scrape off this matted layer. The rotation of the drum very effectively accomplishes the desired result with a minimum amount of power consumption.

The gas rises through the screen of the drum 5 and is caught in the collecting hood 28, from which it passes through the pipes 32 and 33 into the pipe 31. The less active material within the drum 5 is gradually worked toward the discharge opening 22 by the rotary motion of the drum and is discharged through said opening into compartment 4 in a more or less undecomposed state. This undecomposed fibrous material may be removed from the compartment 4 by hand or in any suitable manner.

The necessary concentration of ammonium ion for efficient gasification of the material is maintained by adding a predetermined quantity of a suitable ammonia containing compound, such as a soluble ammonium salt, for example, ammonium chloride. Ammoniacal liquors, such as sewage, stable urine, and the like, are also available as a source of ammonia and any of these may be added in suitable amounts as required to the liquor in the digestion tank.

The table on page 8 illustrates the effect of varying concentrations of ammonia in the digestion liquor on the rate of gasification. It will be understood that an excessive ammonium hydroxide content is to be avoided, since the resulting alkalinity would impair and ultimately destroy the activity of the fermenting bacteria. Similarly, an excessive concentration of ammonium salts would so increase the osmotic pressure of the solution as to have a detrimental effect upon the bacteria. In general, the concentration of $NH_4$—N may be increased to as high as 600 ppm. with corresponding higher rate of gasification before any ill effects are noted.

It will be understood that although my process has been particularly described in connection with the production of a combustible gas mixture largely composed of methane, it is not essential that methane content run above 50% by volume of the mixture to render the mixture combustible and under certain conditions the percentage of methane in the mixed gases resulting from our process may run under 50%. Furthermore, the mixed gases have a commercial value apart from their use in heating, since the relatively high percentage of carbon dioxide makes the separation of carbon dioxide for the manufacture of liquid or frozen $CO_2$ a commercially feasible proposition.

This application is a continuation in part of our copending application, cellulose digestion, Serial No. 386,080, filed August 15, 1929.

We are aware that many changes may be made and numerous details of construction may be varied through a wide range without departing from the principles of this invention, and we, therefore, do not purpose limiting the patent granted hereon otherwise than necessitated by the prior art.

We claim as our invention:

1. Apparatus of the type described, comprising a receptacle forming a fermentation compartment, reticular means therein defining a confined zone having an adit and exit for material to be fermented and means for drawing off gas from said compartment with substantial exclusion of air.

2. Apparatus of the type described, comprising a closed receptacle having an adit and exit for material to be fermented, means for inverting said material within said receptacle and means for drawing off gases resulting from the fermentation process with substantial exclusion of air from the interior of said receptacle.

3. Apparatus of the type described, comprising a covered receptacle provided with a gas vent and an adit and exit for material to be fermented, a gas collecting hood for said vent provided with a liquid seal, a rotary drum open at both ends and having reticular walls mounted within said receptacle for receiving material to be fermented and sealing means between said open drum ends and said adit and exit.

4. Apparatus of the type described, comprising a covered receptacle provided with a gas vent and an adit and exit for material to be fermented, a gas collecting hood for said vent provided with a liquid seal, a rotary drum open at both ends and having reticular walls mounted within said receptacle for receiving material to be fermented, sealing means between said open drum ends and said adit and exit and heating means associated with said receptacle.

5. Apparatus of the type described, comprising a receptacle having a baffle dividing it into a fermentation and a discharge compartment, said baffle having an opening therethrough, a wire covered drum mounted for rotation in said fermentation compartment, said drum having open ends, sealing means between the ends of said drum and the adjacent walls of said receptacle, a feeding spout leading into one of said open drum ends, a cover for said fermentation compartment having a gas vent, a gas collecting hood for said vent and a liquid seal between said vent and hood.

6. Apparatus of the type described, comprising a closed receptacle for a liquid having an adit and exit for material to be fermented, reticular means disposed within said receptacle, means for collecting gases at the top of said receptacle and means for moving said reticular means to facilitate the liberation of gases from the surface of said material.

In testimony whereof, we have hereunto subscribed our names at Urbana, Champaign county, Illinois.

ARTHUR M. BUSWELL.
CLAIR S. BORUFF.